United States Patent [19]
DeMarco

[11] Patent Number: 6,047,199
[45] Date of Patent: Apr. 4, 2000

[54] SYSTEMS AND METHODS FOR TRANSMITTING MOBILE RADIO SIGNALS

[75] Inventor: Anthony T. DeMarco, Duluth, Ga.

[73] Assignee: Bellsouth Intellectual Property Corporation, Wilmington, Del.

[21] Appl. No.: 08/912,190

[22] Filed: Aug. 15, 1997

[51] Int. Cl.[7] ..................................................... H04Q 7/30
[52] U.S. Cl. ........................ 455/572; 455/561; 455/67.1
[58] Field of Search ................................ 455/562, 6.3, 9, 455/561, 572, 423, 424, 67.1; 342/374

[56] References Cited

U.S. PATENT DOCUMENTS

| | | | |
|---|---|---|---|
| 5,570,098 | 10/1996 | Searle et al. | 342/374 |
| 5,675,371 | 10/1997 | Barringer | 455/9 |
| 5,752,161 | 5/1998 | Jantti et al. | 455/561 |
| 5,809,395 | 9/1998 | Hamilton-Piercy | 455/6.3 |

FOREIGN PATENT DOCUMENTS

| | | | |
|---|---|---|---|
| 0 639 035 A1 | 2/1995 | European Pat. Off. | H04Q 7/36 |
| 0 674 452 A2 | 9/1995 | European Pat. Off. | H04Q 7/22 |
| 2 289 827 | 11/1995 | United Kingdom | H04Q 7/30 |
| WO 95/08875 | 3/1995 | WIPO | H04B 1/74 |

*Primary Examiner*—Thanh Cong Le
*Assistant Examiner*—Myron K. Wyche
*Attorney, Agent, or Firm*—Geoff L. Sutcliffe; James L. Ewing, IV; Kilpatrick Stockton

[57] ABSTRACT

A system and method for transmitting cellular signals has linear power amplifiers mounted on a cellular tower within a tower circuit. The linear power amplifiers provide the primary amplification of the signals which are transmitted by the antennas on the tower. By moving the amplifiers from a base station to the tower circuit, the system and method can employ less-expensive and more-reliable amplifiers and need not employ high-cost low-loss feeder lines. The tower circuit also includes a modulator for transmitting status signals down to the base station. The base station includes a demodulator for receiving the status signals and a control circuit for placing a switching circuit in a desired one of a plurality of modes based on the status of the tower circuit. The switching circuit, in a first mode, passes radio signals from combiners to their respective feeder lines and thus to their respective amplifiers and antennas when all transmission paths are operational. If a fault occurs along one or more transmission path, the switching circuit combines the radio signals from the combiners associated with the faulty amplifiers with the radio signals associated with an operational antenna and directs the combined set of radio signals to the operational antenna. In this manner, the system and method provide a redundancy path whereby a fault in the tower circuit does not result in any transmission loss.

46 Claims, 6 Drawing Sheets

SYSTEMS AND METHODS FOR TRANSMITTING MOBILE RADIO SIGNALS

FIELD OF THE INVENTION

The present invention relates generally to system(s) and method(s) for transmitting mobile radio signals including system(s) and method(s) for amplifying and transmitting mobile radio signals on or near a tower.

BACKGROUND OF THE INVENTION

A typical system for transmitting cellular signals within a cellular network, such as system 10 shown in FIG. 1, includes a base station 12, a tower 14, and antennas 16 mounted on the tower 14, often near the top of the tower 14. The base station 12 has a set of radios 18 for receiving telephony signals from the public switched telephone network (PSTN) through a mobile switching center (MSC) and for generating corresponding radio signals. A set of high power amplifiers 20 amplify the radio signals and supply the amplified radio signals over feeder lines 22 to the antennas 16. The antennas 16 generate electric fields which are propagated throughout the radiation patterns of the antennas 16 so that cellular mobile radiotelephones within a cell associated with the antennas 16 may receive the signals. The antennas 16 are preferably mounted well above the ground so as to increase the range of the antennas 16, thereby decreasing the number of required cells within the cellular network. Although the tower 14 has been shown with two antennas 16, the tower 14 may have other numbers of antennas 16 and corresponding feeder lines 22.

The system 10 for transmitting cellular signals suffers from a disadvantage that losses between the antennas 16 and the base station 12 are relatively large. The tower 14 is typically a fairly tall structure so as to increase the range of the antennas 16. As a result, the feeder lines 22 typically must span great distances before reaching the antennas 16. Due to the losses associated with the feeder lines 22 and the great distances over which the feeder lines 22 typically must span, the feeder lines 22 introduce a significant loss in signal strength to the signals supplied to the antennas 16. To reduce these losses, the feeder lines 22 are preferably low-loss cables, such as pressurized coaxial cable. Even with low-loss feeder lines 22, however, the feeder lines 22 nonetheless still introduce a large amount of loss because of the great distances involved between the base station 12 and the tower 14 and between the base of the tower 14 and the antennas 16. For instance, a 400 feet 1⅝ inch coaxial line typically introduces a 4 dB insertion loss for a 2 GHz signal.

In view of these losses in the feeder lines 22, the base station 12 must supply high power signal signals so that the antennas 16 receive signals which are at a sufficiently high power level to reach all cellular mobile radiotelephones within the cell. The base station 12 therefore has amplifiers 20 which operate at a high power level to boost the power level of the radio signals to a level which is sufficient, after considering the losses over lines 22, for the antennas 16 to broadcast signals to the cellular mobile radiotelephones within its cell.

The losses on the feeder lines 22 are not constant but rather fluctuate due to a number of factors, including the temperature of the feeder lines 22. As the temperature decreases, the resistivity of the feeder lines 22 increases, thereby increasing the losses over the feeder lines 22. Since the magnitude of the losses vary, the magnitude of the signals reaching the antennas 16 and the magnitude of the signals transmitted by the antenna 16 would vary accordingly. The antennas 16 preferably operate at the highest permissible power level to maximize the strength of the signals received by the cellular mobile radiotelephones but are often forced below the preferred level due to fluctuations in losses. For example, the amplifiers 20 often comprise 100 to 200 watt multi-channel amplifiers or 50 watt single channel amplifiers. The conventional system 10 therefore suffers from a disadvantage in that it transmits signals at less than optimal levels.

The system 10 is relatively expensive considering the measures necessary to supply the antennas 16 with signals at a sufficiently high power level. These measures, as described above, include low-loss lines 22, which add a substantial cost due to the large distances over which the feeder lines 22 travel, and the amplifiers 20, which are costly due to the high power levels at which they operate. These costs for the low-loss feeder lines 22 and the high power amplifiers 20 are multiplied for an entire cellular network by the number of antennas 16 per tower 14 and also by the number of towers 14 within the cellular network.

In addition to a high cost, a further disadvantage of the system 10 is that it has a relatively high failure rate. As set forth above, the signals supplied over the lines 22 to the antennas 16 must be at a sufficiently high power level to overcome losses associated with the feeder lines 22. These high power signals are generated using amplifiers 20 which operate at extremely high power levels, The operation of the amplifiers 20 at these high power levels and the operation of other components within the system 10 at these high power levels increases the rate at which the amplifiers 20 and other components fail. Thus, in addition to the high losses and high cost, the system 10 also suffers from a relatively high failure rate.

An additional disadvantage associated with the system 10 is that the losses associated with the feeder lines 22 limit the maximum height of the tower 14. The amplifiers 20 can realistically only operate at certain power levels and operation above these levels introduce an unacceptable rate of failure or an unacceptable cost. Because of this practical limitation on signal power level, the feeder lines 22 must be restricted to a certain length if the antennas 16 are to receive signals at a sufficiently high power level. This limitation in feeder line length, in turn, translates into a height restriction for the tower 14. Since the height of the tower 14 effects the propagation area for the antennas 16 and the size of the cell, the limitation in tower height 14 also results in a need for a greater number of cells within the cellular network, thereby increasing the costs of the cellular network.

A further disadvantage of the system 10 is that it is often difficult finding suitable real estate for the base station 12. In urban areas, for instance, the tower 14 may need to be placed on or in a building or on some other existing structure. To minimize the distance between the antennas 16 and the amplifiers 20, the base station 10 is preferably located in close proximity to the tower 14. A close location to the tower 14, however, is often not possible and the closest suitable location within a building which is not presently being utilized for the amplifiers 20 may be in an underground closet or similar distant location. Once a location for the base station 12 has been found, the location must then be modified to provide the necessary wiring, cooling and ventilation, and security measures for the electronics within the base station 12. The need for a large area to house and cool the base station 12 renders it difficult and expensive to place the base station 12 in a building. Some rural areas also present similar difficulties in positioning the base station 12 close to the tower 14 in view of the harsh terrain that may surround the tower 14.

SUMMARY OF THE INVENTION

The present invention solves the problems described above by moving the amplifiers from a base station to a tower circuit located on a cellular tower. By amplifying the signals at the tower, the amplifiers need not be expensive high-power amplifiers which are prone to fail but may instead comprise less-expensive more-reliable amplifiers. The placement of the amplifiers in the tower circuit eliminates the need for the expensive low-loss feeder lines whereby the feeder lines may instead comprise less-expensive coax cable, other types of lines, such as optical cable, or a wireless link. In addition to the amplifiers, the tower circuit includes circuitry for transmitting status signals down to the base station. The status signals indicate the performance of the tower circuit and preferably include alarm signals for indicating, for instance, a high temperature alarm, a low power supply alarm, a fault in a linear amplifier, or a fan failure. The base station receives the status signals and responds by routing the signals from an amplifier that has failed to an operative amplifier and associated antenna.

In the preferred embodiment, the base station includes combiners for combining signals from multiple radios and a switching circuit for receiving the signals combined from the combiners. The switching circuit is operable in a plurality of modes with a first mode being one in which all amplifiers in the tower circuit are functioning properly and the switching circuit passes the signals from the combiners over their respective feeder lines to their assigned amplifiers and antennas. In other modes of the switching circuit, in response to a failure in one or more amplifiers, the switching circuit combines the signals assigned to the one or more failed amplifiers with signals assigned to an operable amplifier and routes the combined signals to the operable amplifier. The switching circuit therefore permits the transmission of all cellular signals despite the failure of one or more amplifiers.

The tower circuit includes a modulator connected to the amplifiers for generating the status signals which are passed down the feeder lines to the base station. The base station includes a demodulator for detecting the status signals from the tower circuit and a control circuit for placing the switching circuit in the appropriate mode based on the status of the tower circuit.

The base station also includes a reference tone generator for generating out-of-band tones at a predefined voltage level. The tower circuit includes circuitry for detecting these reference tones and for comparing the tones to a reference voltage. Based on this comparison of the reference tones to the reference voltage, the tower circuit preferably attenuates the received telephony signals to a constant signal level before inputting the signals to a linear power amplifier. The constant signal level of the signals input to the linear power amplifier advantageously allows the linear power amplifier to consistently output signals at the optimal level despite fluctuations in losses along feeder lines.

Accordingly, it is an object of the present invention to provide a system and method for transmitting mobile radio signals that can transmit signals over feeder lines at lower power levels.

It is another object of the present invention to provide a system and method for transmitting mobile radio signals that can avoid the cost of low-loss feeder lines.

It is a further object of the present invention to provide a system and method for transmitting mobile radio signals that can avoid the need and cost for high power amplifiers.

It is yet another object of the present invention to provide a system and method for transmitting mobile radio signals that can include taller towers and thus longer feeder lines.

It is yet a further object of the present invention to provide a system and method for transmitting mobile radio signals that can more easily accommodate suitable real estate for a base station.

It is also an object of the present invention to provide a system and method for transmitting mobile radio signals that has an overall lower cost.

It is yet another object of the present invention to provide a system and method for transmitting mobile radio signals that has a lower failure rate and is thus more reliable.

It is still another object of the present invention to provide a system and method for transmitting mobile radio signals that provide stable operation in light of variations in losses on feeder lines.

Other objects, features and advantages of the present invention are apparent in the remainder of this document.

BRIEF DESCRIPTION OF THE DRAWINGS

The accompanying drawings, which are incorporated in and form a part of the specification, illustrate preferred embodiments of the present invention and, together with the description, serve to explain the principles of the invention. In the drawings.

DETAILED DESCRIPTION

Figure 2:
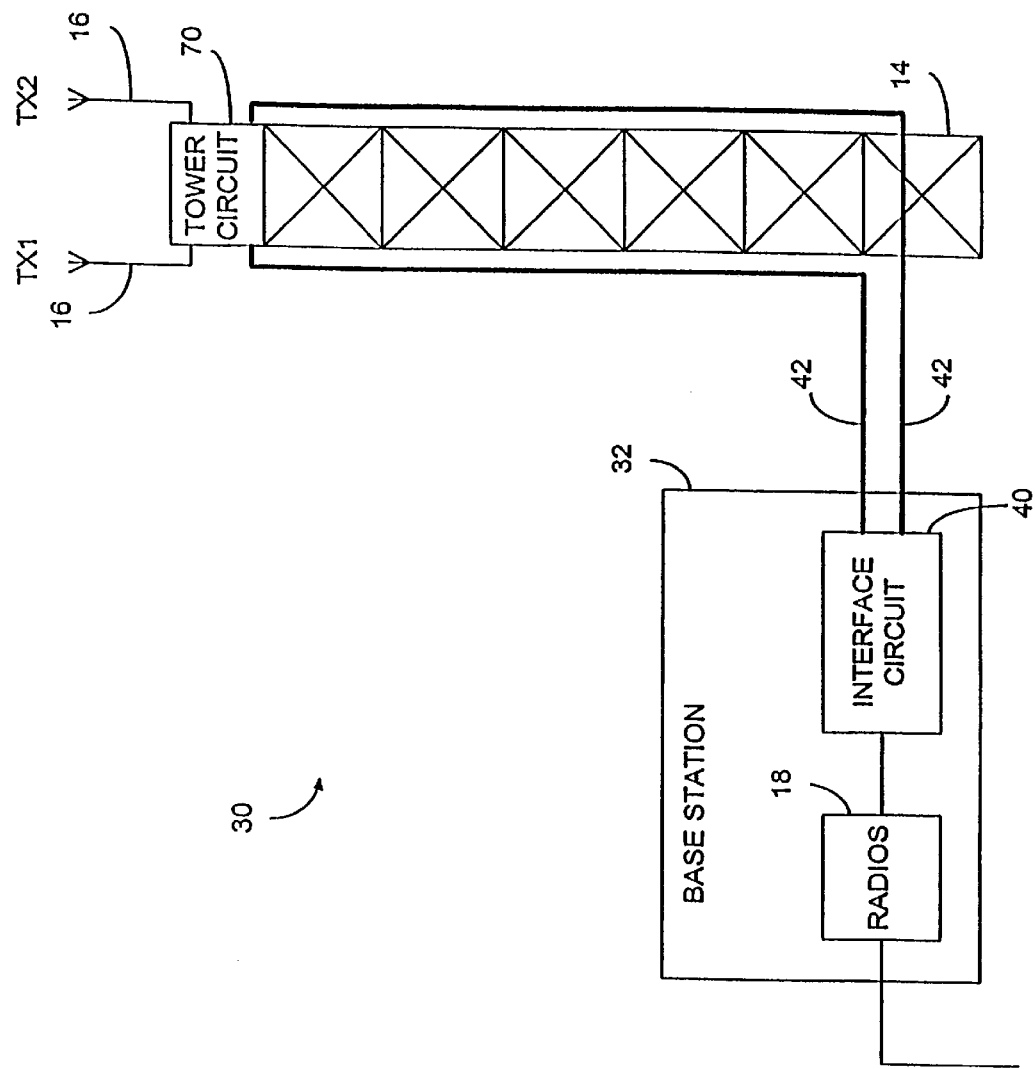
FIG. 2 is a diagram of a system for transmitting telephony signals to mobile radiotelephones according to a preferred embodiment of the invention in a mobile radio network.

Reference will now be made in detail to preferred embodiments of the invention, non-limiting examples of which are illustrated in the accompanying drawings. With reference to FIG. 2, a system 30 for transmitting mobile radio signals according to the invention comprises a base station 32, a tower 14, antennas 16, and a tower circuit 70. In general, the base station 32 receives telephony signals from the public switched telephone network ("PSTN") through a mobile switching center ("MSC") and supplies the telephony signals to a set of radios 18. The radios 18 generate radio signals which are processed by an interface circuit 40 before being carried by feeder lines 42 to the tower circuit 70. The tower circuit 70 processes the signals and supplies them to the antennas 16 which propagate the signals to mobile radiotelephones within a cell associated with the system 30. Although a single system 30 for transmitting mobile radio signals is illustrated in FIG. 2, a network often comprises a plurality of such systems 30 with each system 30 dedicated to one or more cells within the network. Further, the systems 30 within a network are preferably interconnected to each other, such as through an SS7 backbone.

As will be appreciated by those skilled in the art, the antennas 16 may also receive signals transmitted by the mobile radiotelephones, which are transmitted down the feeder lines 42 to the base station 32. Although not shown, the base station 32 preferably includes amplifiers and receivers for detecting and amplifying the received signals and converter circuitry for placing the received signals onto the PSTN through the MSC. Also, although not shown, the system 30 includes conductors between the base station 32 and tower circuit 70 for providing power to the tower circuit 70. The additional circuitry for receiving signals, the power supply connections, the interconnections to other systems 30, and the interconnection of system 30 to the MSC and PSTN have been omitted to simplify the description of the invention.

The invention will be described with reference to a cellular system 30. The invention, however, is not limited to just cellular systems 30 but rather may be implemented with any type of mobile radio system. For instance, the system 30 may operate on Specialized Mobile Radio (SMR) systems, Enhanced SMR (ESMR) systems, Personal Communications Systems (PCS), as well as other types of mobile radio systems.

Figure 1:
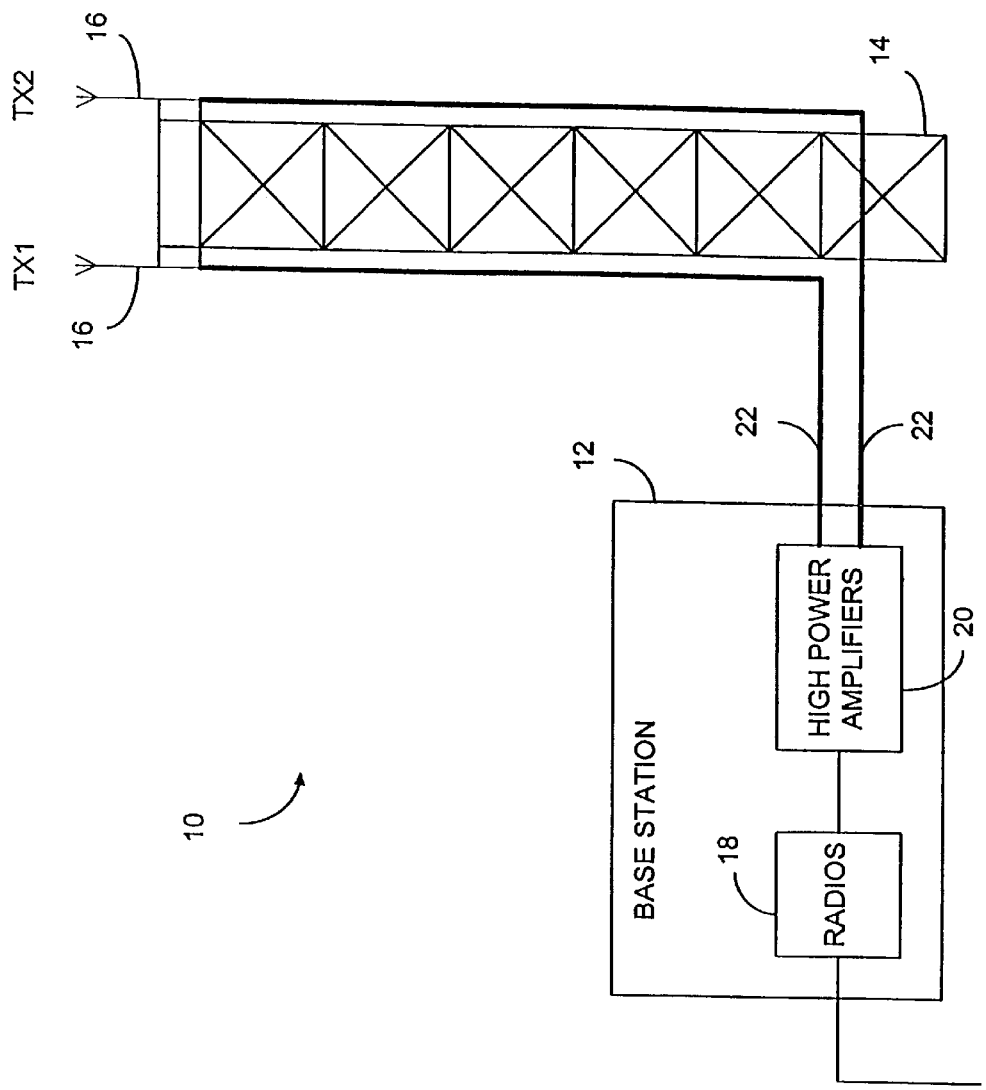
FIG. 1 is a diagram of a conventional system for transmitting telephony signals to mobile radiotelephones in a mobile radio network.

FIG. 2 shows a system 30 according to the present invention, which operates differently in many respects from what is shown in FIG. 1. In contrast to the conventional system 10 shown in FIG. 1, the interface circuit 40 shown in FIG. 2 does not provide high level amplification of the signals; instead, the amplification is primarily performed in the tower circuit 70. As will be described in further detail below, the interface circuit 40 communicates with the tower circuit 70 and routes radio signals over one or both of the feeder lines 42. Also, in contrast to the feeder lines 22 in system 10, the feeder lines 42 according to the invention are not restricted simply to low-loss expensive lines but instead may comprise higher-loss less expensive lines, such as standard coaxial cable. The tower circuit 70, as will be described in more detail below, provides the primary amplification of the radio signals and also communicates with the interface circuit 40.

Figure 3A:
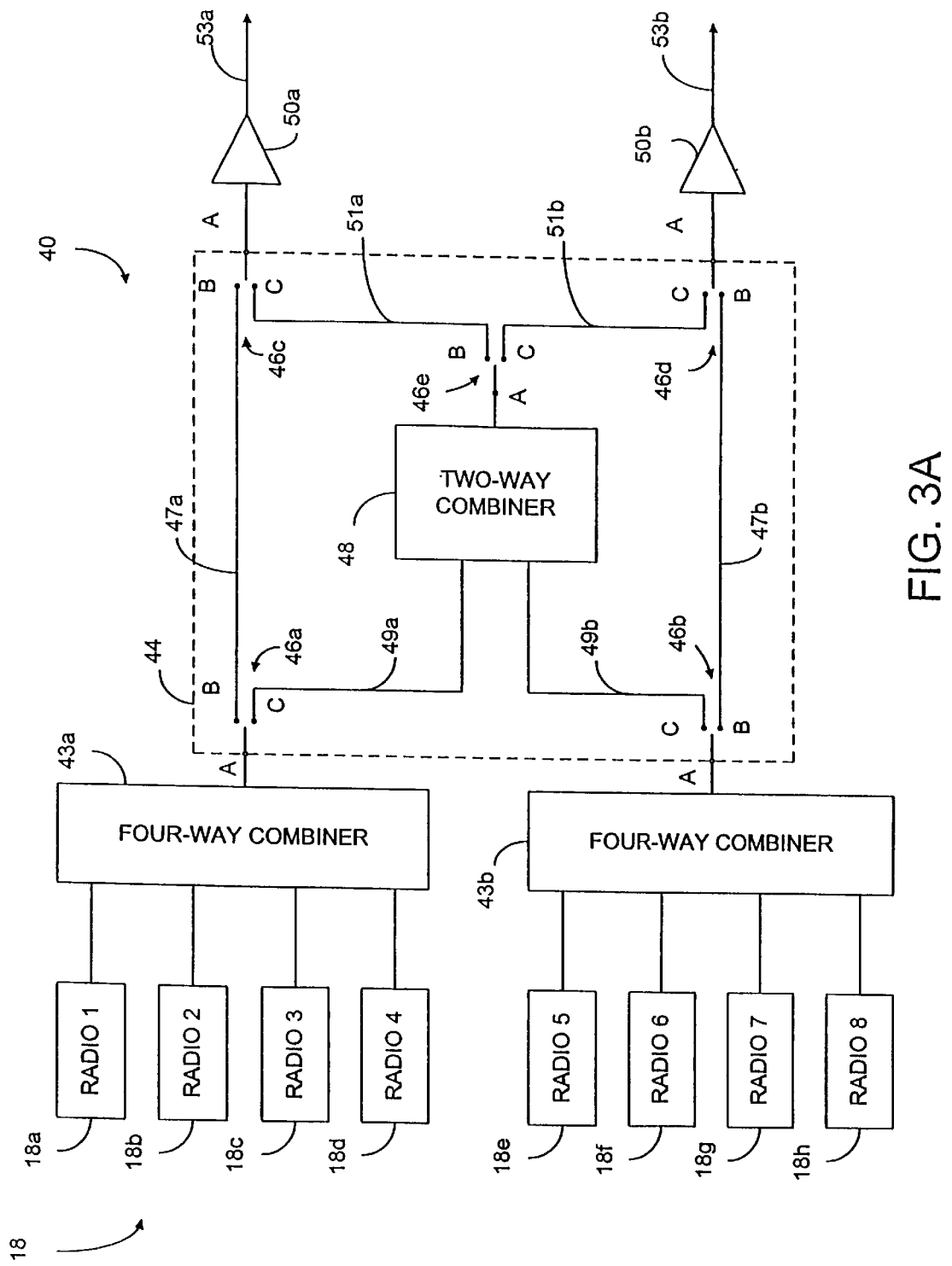
FIGS. 3A and 3B are circuit block diagrams of an interface circuit in the system of FIG. 2.
Figure 3B:
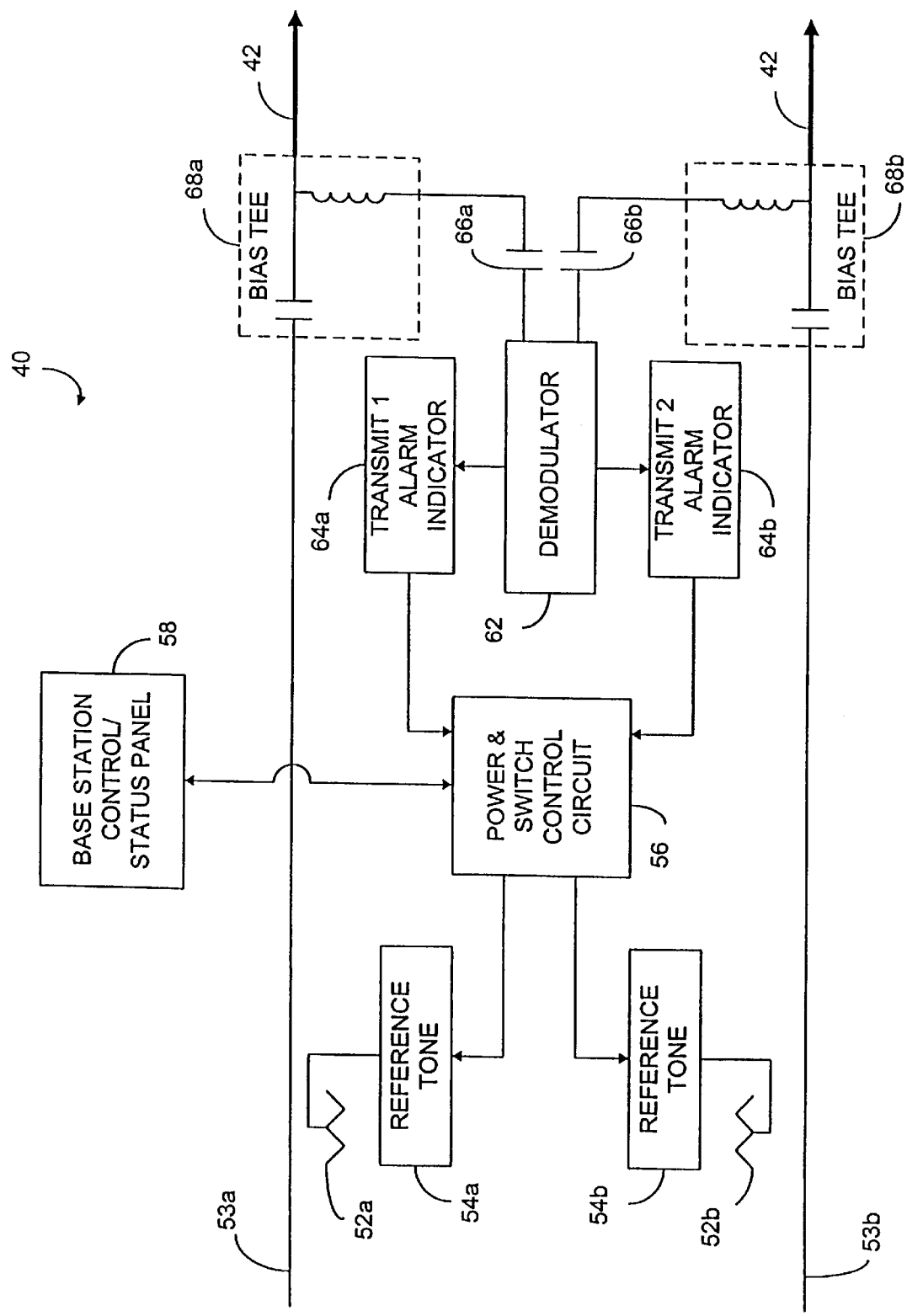

The interface circuit 40 is shown in more detail in FIGS. 3A and 3B. With reference to FIG. 3A, the interface circuit 40 includes a pair of four-way combiners 43a and 43b for combining signals from a set of radios 18. In this example, a first four-way combiner 42a combines signals from radios 18a to 18d and a second four-way combiner 42b combines signals from radios 18e to 18h. The radio signals combined by the combiners 42 are supplied to a switching circuit 44.

The switching circuit 44 is operable in a plurality of modes. As will be described in further detail below, the tower circuit 70 includes amplifiers and other circuitry for amplifying and directing signals received from feeder lines 42 to the antennas 16. Since the tower circuit 70 is located on the tower 14, maintenance and repair of the tower circuit 70 becomes difficult and cannot be performed quickly or easily. Consequently, an amplifier that has failed may remain out of commission and thus inoperable for a substantial amount of time. The interface circuit 40 advantageously has a switching capability and a communication capability with the interface circuit 70 so that signals originally directed to one antenna 16 can be redirected to another antenna 16 when a failure occurs in a path to the one antenna 16. As a result, radio signals that would have been blocked by a failed amplifier or by some other failure can be redirected and transmitted by another antenna 16. By being operable in a plurality of modes, the switching circuit 44 can act to redirect radio signals to operable antennas 16.

With reference to FIG. 3A, the switching circuit 44 includes a number of switches 46 and a combiner 48. In this example, the switching circuit 44 may comprise a quadrature hybrid circuit having five double-pole single-throw switches 46a to 46e and a two-way combiner 48. In a first mode, when all amplifiers and antennas 16 in the tower circuit 70 are fully operational, a first switch 46a receives signals from the four-way combiner 43a at its A terminal and supplies the signals to its B terminal onto conductor 47a. A third switch 46c supplies signals it receives over conductor 47a from its terminal B to its terminal A and then to a preamplifier 50a. A second switch 46b receives the radio signals from four-way combiner 43b at its A terminal and supplies these radio signals to its B terminal onto conductor 47b. A fourth switch 46d receives the radio signals from conductor 47b and routes the signals from its B terminal to its A terminal and to preamplifier 50b. Thus, in a first mode of operation, the signals from the four-way combiners 43a and 43b are passed directly through the switching circuit 44 to their respective preamplifiers 50a and 50b.

In both second and third modes of operation for the switching circuit 44, switch 46a routes the radio signals from combiner 43a from its A terminal to its C terminal onto conductor 49a so that the signals may be supplied to the two-way combiner 48. The switch 46b also routes the signals from the four-way combiner 43b to the two-way combiner 48 by passing signals from its A terminal to its C terminal onto conductor 49b. The two-way combiner 48 combines the radio signals from both four-way combiners 43, and thus from all radios 18a to 18h, and supplies the combined output to a fifth switch 46e.

In a second mode of operation when, for instance, an antenna 16 fails which normally receives signals passing through preamplifier 50b, the switch 46e routes the signals from its terminal A to its terminal B onto conductor 51a. The third switch 46c is positioned in the second mode to pass signals from conductor 51 received at its C terminal to its A terminal. Thus, in the second mode of operation signals from both four-way combiners 43a and 43b are directed to the two-way combiner 48 and are combined and then passed through switches 46e and 46c to preamplifier 50a and ultimately to a functional antenna 16.

A third mode of operation for the switching circuit 44 occurs when an antenna 16 which normally receives signals passing through preamplifier 50a fails. In the third mode of operation, the combined radio signals from the two-way combiner 48 are supplied to switch 46e and are passed from the A terminal to the C terminal of switch 46e. From the C terminal of switch 46e, the signals from all radios 18a to 18h are directed over conductor 51b to switch 46d and are then passed from the C terminal to the A terminal of switch 46d before reaching preamplifier 50b. Thus, in the third mode of operation, the radio signals from all radios 18a to 18h are combined and then passed to preamplifier 50b and ultimately to a functional antenna 16.

With reference to FIG. 3B, the interface circuit 40 includes a power and switch control circuit 56. The power and switch control circuit 56 places the switching circuit 44 in a desired one of the plurality of modes. The power and switch control circuit 56 therefore controls the positions of each switch 46 depending upon the mode of the switching circuit 44. The power and switch control circuit 56 may control the positioning of the switches in any suitable manner, such as with a set of relays.

The control circuit 56 receives communications from the tower circuit 70 and determines the appropriate mode for the switching circuit 44. The communications from the tower circuit 70 are desirable since they can inform the control circuit 56 of a failure in a transmission path to one of the antennas 16, such as in a linear power amplifier. In response to a failure, the control circuit 56 can act quickly to redirect transmissions away from the failed antenna 16 toward a functional antenna 16 thereby maintaining communications with the cellular mobile radiotelephones. A failed antenna 16, as used throughout this description, does not refer specifically to the antenna element itself but rather refers generally to a transmission path leading toward an antenna 16. Thus, although the antenna 16 itself may be capable of transmitting signals, the antenna 16 is considered to be a failed antenna 16 if a fault occurs in its transmission path which prevents the antenna 16 from receiving any signals and thus from transmitting any signals.

Communications from the interface circuit 40 to the tower circuit 70 are desirable in that they may be used by the tower circuit 70 in regulating the amplification of the radio signals to ensure that signals are transmitted by the antennas 16 at a desired level, which is often at the maximum permissible power level. To communicate from the interface circuit 40 to the tower circuit 70, the interface circuit 40 includes reference tone generators 54a and 54b and coupling members 52a and 52b. The reference tone generators 54a and 54b generates signals which are added to the radio signals on conductors 53a and 53b through coupling members 52a and 52b, respectively. The reference tone generators 54 generate out-of-band signals which do not interfere with the radio signals supplied to the feeder lines 42 and which are at a predefined voltage level. In the preferred embodiment, the reference tones preferably comprise 0 dbm signals generated at a frequency outside the operating bands of the system 30. As an example, the reference tones may be 20% outside of the operating band whereby a system 30 operating up to 890 MHz would have 1068 MHz reference tones.

To receive communications from the tower circuit 70, the interface circuit 40 includes a demodulator 62, which may comprise a frequency shift key (FSK) demodulator or, in the preferred embodiment, an RS485 demodulator. The communication signals from the tower circuit 70 are out-of-band signals and are routed down the feeder lines 42 to the interface circuit 40. At the interface circuit 40, the communication signals from the tower circuit 70 are separated from the radio signals sent to the tower circuit 70 by bias tees 68a and 68b and are passed to the demodulator 62 through coupling capacitors 66a and 66b. The status signals received from the tower circuit 70 are detected and demodulated by the demodulator 62 and pass through alarm indicators 64a and 64b before reaching the control circuit 56. The control circuit 56 provides outputs to a base station control/status panel to provide visual and/or audible indications of the system's status.

The alarm indicators 64 monitor the status signals for alarm signals. When the status signal represents an alarm condition, an alarm indicator 64 generates an alarm signal and provides the alarm signal to the control circuit 56 which then a suitable alarm with the base station control/status panel 58. The control circuit 56 also responds by placing the switching circuit 44 in an appropriate mode of operation. For instance, upon a failure along the transmission path for the antenna 16 associated with alarm indicator 64a, such as a failed linear power amplifier, the alarm indicator 64a generates an alarm signal which is supplied to the control circuit 56. The control circuit 56 responds by placing the switching circuit 44 in the second mode of operation so that all signals are directed to the operable antenna 16. In the preferred embodiment, the control circuit comprises an MC68HC812 micro-controller manufactured by Motorola.

Figure 4:
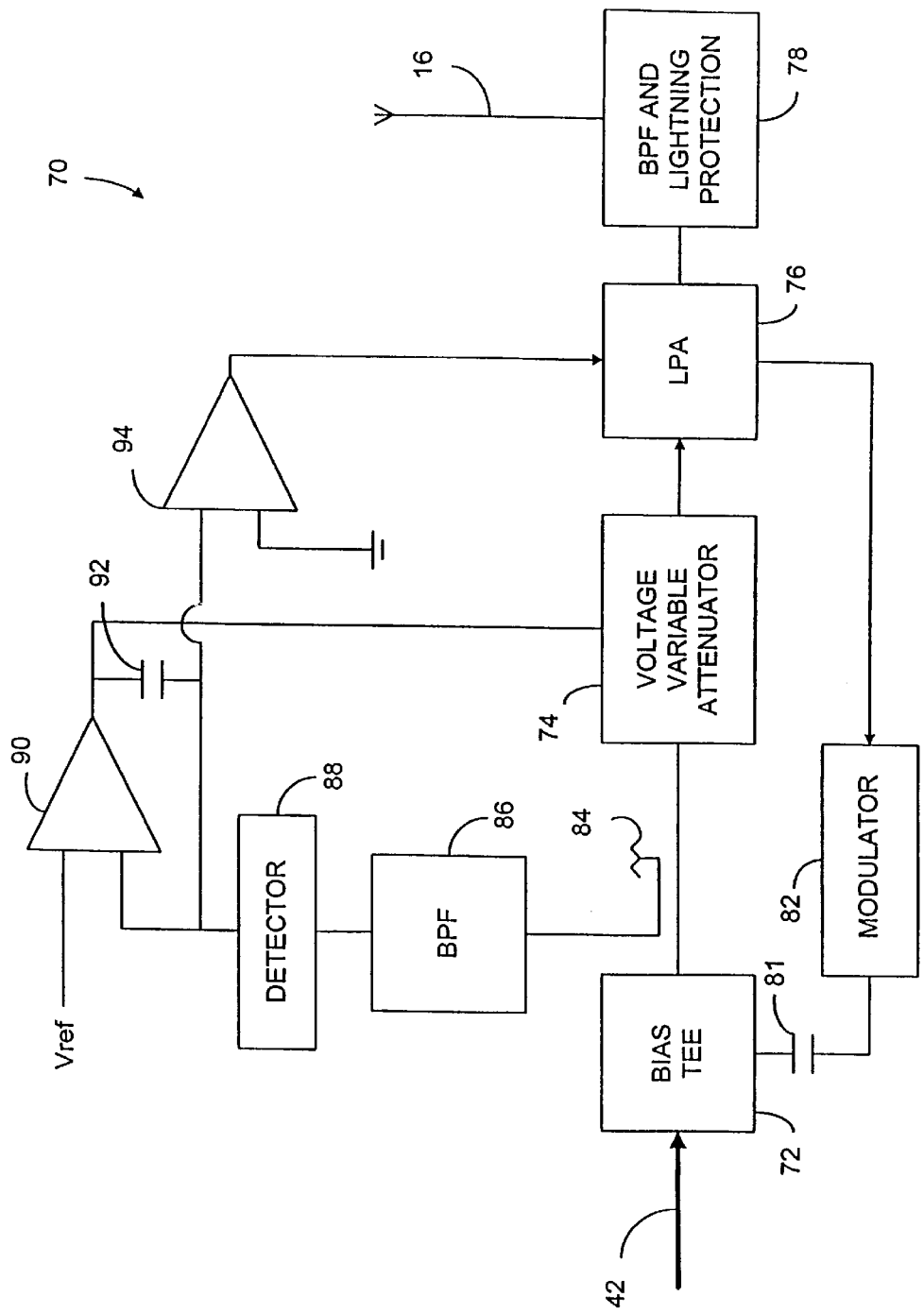
FIG. 4 is a circuit block diagram of a tower circuit in the system of FIG. 2.

The tower circuit 70 for one antenna 16 is shown in FIG. 4. The circuitry for the other antenna 16 is identical to that shown and has accordingly been omitted to simplify the description of the invention. With reference to FIG. 4, the tower circuit 70 includes a coupling member 84 for detecting the reference tones generated at the interface circuit 40 by the reference tone generators 54. The signals picked up by the coupling member 84 are sent through a band-pass filter 86 to isolate the reference tones and are input into a detector 88. The detector 88 is a level detector and provides the magnitude of the reference tones to a first comparator 90 and also to a second comparator 94. The first comparator 90 compares the magnitude of the detected reference tones with a reference voltage Vref. The difference between the reference voltage Vref and the detected magnitude of the reference tones is input to a voltage variable attenuator 74. The second comparator 94 detects the presence of the reference tones and supplies an enable signal to a linear power amplifier (LPA) 76. If the comparator 94 fails to detect the reference tones, the comparator 94 generates a disable signal that is supplied to the LPA 76 to power down the LPA 76.

The signals from feeder line 42 are supplied to the voltage variable attenuator 74 to ensure that the power level of the signals supplied to the LPA 76 is at a fixed constant value. This fixed constant value is set so that the signals output from the LPA 76 are at the optimal power level, typically the maximum permissible power level. As discussed above, the power level of the signals supplied over the feeder line 42 varies due to various factors, such as temperature. If these signals from the feeder line 42 were supplied directly to the LPA 76, the power level of the signals output from the LPA 76 and routed to the antenna 16 would also vary and would only sporadically be at the optimal power level. The voltage variable attenuator 74 ensures that fluctuations in the level of the signals received at the tower circuit 70 do not cause the power level of signals transmitted by the antenna 16 to vary from the optimal power level. The signals output from the LPA 76 are supplied to a band-pass filter and lightning protection circuitry 78 and then to the antenna 16. In the preferred embodiment, the LPA 76 comprises a 25 watt linear power amplifier manufactured by Powerwave Technologies of Irvine, Calif.

The tower circuit 70 includes a modulator 82 for communicating with the interface circuit 56. The modulator 82 may comprise a frequency shift-key (FSK) modulator or, in the preferred embodiment, an RS485 modulator. The modulator 82 generates out-of-band signals which are coupled to the feeder line 42 through a coupling capacitor 81 and a bias tee 72. The LPA 76 may comprise any conventional linear power amplifier which monitors its operations and generates status signals. These status signals, for instance, may include alarm signals indicating a high temperature, a low supply voltage, a main amplifier path fault, or faulty fan. The status signals, however, are not limited to alarm signals may allow the interface circuit 40 to monitor other aspects of the tower circuit 70. The modulator 82 modulates these status signals and directs the modulated status signals down the feeder line 42 to the base station 32. The modulator 82 preferably comprises an L7C491CS modulator manufactured by Linear Technology Corporation of Milpitas, Calif.

The system 30 shown in FIG. 2 differs from the conventional system 10 shown in FIG. 1 in that system 30 includes the tower circuit 70 located on the tower 14. The system 10 shown in FIG. 1 places only the antennas 16 on top of the tower 14 and does not place any other electronics on top of the tower 14. Instead, the conventional system 10 provides all of the amplification capability within the base station 12. As an example, the feeder lines 22 in the conventional system 10 may carry 100 to 500 watt signals. The lines 42 according to the invention, in contrast, may carry signals having power levels of 50 milliwatts or less. By moving the amplifiers to the tower circuit 70, the system 30 achieves a number of advantages over the conventional system 10 for transmitting cellular signals which will become more apparent from the description below.

With the invention, the overall system 30 is less expensive than the conventional system 10 since system 30 does not require the expensive low-loss feeder lines 12 and lower power amplifiers 76 are needed for the same power to the antenna 16. The system 30 presents lower operating costs due to more efficient operation since the power intended to be dissipated by antennas 16 is not lost along the feeder lines 12. The system 30 has a flexible frequency utilization since channel frequency spacings are arbitrarily chosen for a multi-channel LPA as opposed to the mandatory greater than 500 kHz spacings typical of cavity based multiplexers. Further, the system 30 has a greater reliability in comparison to system 10. With the invention, the system 30 provides redundant operation and does not require mechanically tuned cavities to accommodate adaptive frequency selection techniques.

Moreover, the invention provides automatic compensation for cable attenuation variation due to temperature variation or other factors. The invention provides automatic redundancy by utilizing separate transmission paths which can be operated independently or which can be merged together onto a single path. The invention provides complete status monitoring and control of the tower circuit from the base station. The invention does not require additional communication lines between the tower and the base station but instead all control, monitoring and RF connection to the tower circuit 70 can be multiplexed together onto the feeder lines.

The invention provides a fail-safe fail-soft mechanism. The invention is fail-safe since, in the event of a failure, signals from all radios are transmitted. The invention is also fail-soft since, in the event of a failure, the amplifiers 76 and other components of the system 30 maintain their current levels of operation and transmit signals at half-power and are not stressed to operate at higher power levels.

Figure 5A:
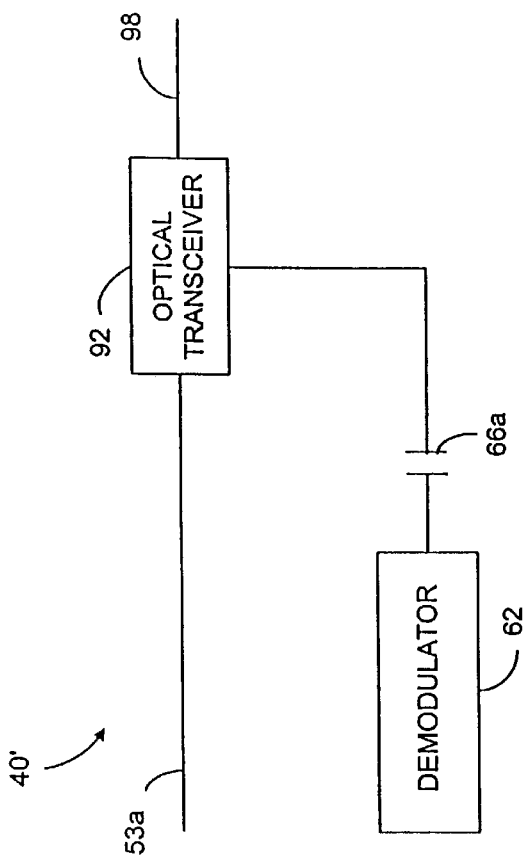
FIGS. 5A and 5B are partial views of an interface circuit and tower circuit, respectively, according to a second embodiment of the invention.

The invention is not limited to the transmission of RF signals from the base station 32 to the tower circuit 70 over feeder lines 42 but may include wireless transmission of signals and also the transmission of signals over different types of cables or lines. For instance, in a second embodiment of the interface circuit 40' as shown in FIG. 5A, signals on line 53a which are received from preamplifier 50a are input to a fiber optic link transceiver 92, which may comprise a DFB laser for generating optical signals and a phototransistor or other type of optical detector for generating corresponding electrical signals. The optical signals output from the transceiver 92 are sent to a tower circuit 70' via optical cable 98. The transceiver 92 also converts the optical signals from the tower circuit 70' into electrical signals and passes the electrical signals to the demodulator 62. Although not shown, the interface circuit 40' may include an attenuator for placing the electrical signals within the dynamic range of the transceiver 92.

Figure 5B:
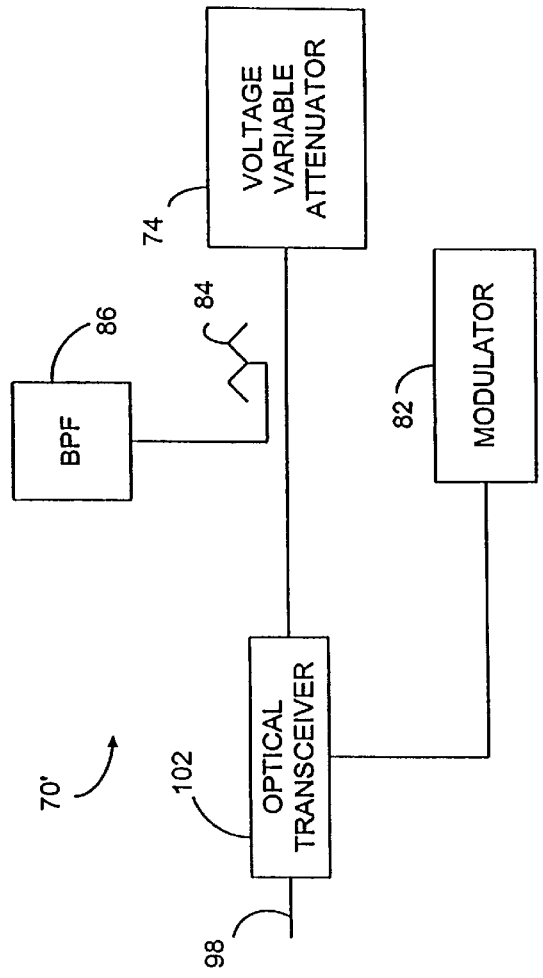

The tower circuit 70', as shown in FIG. 5B, includes a fiber optic link transceiver 102 for receiving optical signals over optical cable 98. The output of the transceiver 102 corresponds to the output of the bias tee 72 of tower circuit 70. The output of the modulator 82 is supplied to the transceiver 102 which converts the electrical signals from the modulator 82 into corresponding optical signals and routes these optical signals down the optical cable 98 to the interface circuit 40'. Also, signals detected and received by antennas 16 on the tower 14 may be transmitted over optical cable 98 to the interface circuit 40'.

By transmitting signals over optical cables 98, the system 10 is able to substantially reduce the amount of losses introduced between the base station 32 and the tower circuit 70'. Since the signal loss over optical cables may be insignificant, the tower circuit 70' may supply the signals from the transceiver 102 directly to the LPA 76, thereby eliminating the voltage variable attenuator 74 and related circuitry. The optical cable 98 is also advantageous in that it is highly immune to noise whereby signals supplied to the tower circuit 70' would have a higher signal to noise ratio than signals transmitted over feeder lines 42.

The forgoing description of the preferred embodiments of the invention has been presented only for the purpose of illustration and description and is not intended to be exhaustive or to limit the invention to the precise forms disclosed. Many modifications and variations are possible in light of the above teaching.

For example, the invention is not limited to the transmission of signals from eight radios 18 and the use of two four-way combiners 43 but includes systems that have other numbers of radios 18 and other types of combiners. Further, the invention may be used in systems that have more than two feeder lines 42 between the base station 32 and tower circuit 70 and more than two antennas 16. Moreover, the switching circuit according to the invention may switch between multiple combiners and provide outputs on more than one line. As an example, a system according to the invention may have three sets of five radios with each set separately combined in five-way combiners. The switching circuit, upon detection of a failure in one antenna, can combine any two sets of signals together and route the signals to another antenna and, upon detection of two failures, can route the signals from all three sets of radios to the single working antenna.

Although the communication has been described with reference to status signals transmitted at the tower circuit 70 and received at the interface circuit 40, the system may also include communications initiating at the interface circuit 40 which are received at the tower circuit 70. These communications may include messages or commands which are issued in response to a status signal from the tower circuit 70 or which are initiated from another location. For instance, in response to a failure in a fan for one LPA 76 in the tower circuit 70, the interface circuit 40 may issue a command to disable that one LPA 76. The communication from the interface circuit 40 may be generated by the control circuit 56 by modulating the reference tones or may be generated by a separate modulator. At the tower circuit 70, signals detected through coupling member 84 may be routed to a tower control circuit which controls the operations of the LPAs 76 and other circuitry in the tower circuit 70. As another example, the communications from the interface circuit 40 to the tower circuit 70 may adjust the amount of attenuation performed by the voltage variable attenuator 74 and thus allow remote adjustments to the power level transmitted by the antennas 16.

In the embodiment of the interface circuit 40' and tower circuit 70' shown in FIGS. 5A and 5B, signals received by an antenna 16 from radiotelephones may be sent down the same optical cable 98 which supplies signals to the antenna 16. The signals transmitted down the optical cable 98 are modulated on a different carrier than the signals transmitted up the optical cable 98. The tower circuit 70' preferably includes a pilot tone generator and the interface circuit 40' preferably includes a level detector and gain control circuitry so that the link from the tower circuit 70' to the interface circuit 40' may be monitored and signal levels may be appropriately adjusted. Even though optical fibers have extremely low signal losses, the use of a pilot tone generator and gain control circuitry to monitor power levels is desired since significant variations in losses can occur due to slight differences in the positioning of the optical couplings.

Also, although in the examples illustrated the communication between the base station 32 and the tower circuit 70 is over the feeder lines 42 or optical cable 98, the communication is preferably over a dedicated RS485 line. The communications, however, may be over other types of links or lines. The tower circuit 70, for instance, may include microwave transmitters for sending the status signals to a microwave receiver at the base station 32. Alternatively, a dedicated line separate from the feeder lines 42 or cable 98 may be used to carry communications between the base station 32 and tower circuit 70.

Further, the invention has been described with reference to a system 30 in which the antennas 16 are omni-directional. As is common in the art, a tower 14 may instead comprise a set of directional antennas with each antenna being assigned a specific sector, such as three antennas 16 for three sectors. The invention may therefore be expanded to have redundancy in each sector of the system 30. The invention has also been described with reference to system 30 which has two antennas 16. The invention, however, also incorporates systems in which outputs of the LPAs 76 are passed through a phase combiner and are propagated by a single antenna 16.

Additionally, the invention has been described with reference to systems or methods that switch or redirect radio signals in the event of a failure in one transmission path. The invention, however, can be switched for reasons other than an alarm condition. For instance, the invention permits the maintenance work to be performed on one transmission path without requiring any loss in channel capacity. The invention therefore includes the manual switching of the signals from one path to another transmission path.

The embodiments were chosen and described in order to explain the principles of the invention and their practical application so as to enable others skilled in the art to utilize the invention and various embodiments and with various modifications as are suited to the particular use contemplated.

What is claimed is:

1. A system for transmitting mobile radio signals, comprising:
    a base station having first and second radios for converting first and second telephony signals received from a telecommunications switching center into first and second radio signals, respectively, and a combiner for combining the first and second radio signals into a combined radio signal;
    a tower circuit, located remote from the base station and near a mobile radio antenna, having an amplifier for amplifying the combined radio signal and for supplying the amplified radio signal to the antenna for propagating the amplified radio signal to a radiotelephone;
    a transmission link for carrying the combined radio signal from the base station to the tower circuit; and
    a failure detection circuit for detecting a failure in a signal path between the base station and the antenna and for redirecting the combined radio signal to a second signal path for transmission to the radiotelephone.

2. The system as set forth in claim 1, wherein the combined radio signal output by the base station has a power level less than 100 watts.

3. The system as set forth in claim 1, wherein the radio signal output by the base station has a power level less than 10 watts.

4. The system as set forth in claim 1, wherein the radio signal output by the base station has a power level less than 1 watt.

5. The system as set forth in claim 1, wherein the transmission link comprises an optical fiber.

6. The system as set forth in claim 1, wherein the transmission link comprises coaxial cable.

7. The system as set forth in claim 1, wherein the amplifier comprises a multi-channel linear power amplifier.

8. The system as set forth in claim 1, further comprising third and fourth radios for converting third and fourth telephony signals into third and fourth radio signals, a second combiner for combining the third and fourth radio signals into a second combined radio signal, a second amplifier located near a second antenna for amplifying the second combined radio signal, and a second transmission link for carrying the second combined radio signal from the second combiner to the second amplifier.

9. The system as set forth in claim 8, further comprising a switching circuit for combining the first combined radio signal with the second combined radio signal to generate a third combined radio signal and directing the third combined radio signal over the second transmission link to the second amplifier.

10. A method of transmitting mobile radio signals to a radiotelephone, comprising:
    receiving first and second telephony signals at a base station from a telecommunications switching center and converting the first and second telephony signals into first and second radio signals, respectively;
    combining the first and second radio signals into a combined radio signal;
    transmitting the combined radio signal over a transmission link to an amplifier located remote from the base station and near an antenna;
    amplifying the combined radio signal with the amplifier to form an amplified signal;
    propagating, with the antenna, the amplified signal to a radiotelephone; and
    detecting a failure in a signal path between the base station and the antenna and redirecting the combined radio signal to a second signal path for transmission to the radiotelephone.

11. The method as set forth in claim 10, wherein the step of transmitting comprises a step of transmitting the combined radio signal at a power level less than 100 watts.

12. The method as set forth in claim 10, wherein the step of transmitting comprises a step of transmitting the combined radio signal at a power level less than 10 watts.

13. The method as set forth in claim 10, wherein the step of transmitting comprises a step of transmitting the combined radio signal at a power level less than 1 watt.

14. The method as set forth in claim 10, wherein the step of transmitting the radio signals comprises a step of transmitting the combined radio signal over an optical fiber.

15. The method as set forth in claim 10, wherein the step of transmitting the radio signals comprises a step of transmitting the combined radio signal over coaxial cable.

16. The method as set forth in claim 10, wherein the step of amplifying comprises a step of amplifying the combined radio signal with a multi-channel linear power amplifier.

17. The method as set forth in claim 10, further comprising the steps of converting third and fourth telephony signals into third and fourth radio signals, combining the third and fourth radio signals into a second combined radio signal, amplifying the second combined radio signal with a second amplifier located near a second antenna, and propagating the second combined radio signal with the second antenna.

18. A method of transmitting mobile radio signals to a radiotelephone, comprising:

receiving first and second telephony signals at a base station from a telecommunications switching center and converting the first and second telephony signals into first and second radio signals, respectively;

combining the first and second radio signals into a combined radio signal;

transmitting the combined radio signal over a transmission link to an amplifier located remote from the base station and near an antenna;

amplifying the combined radio signal with the amplifier to form an amplified signal;

propagating, with the antenna, the amplified signal to a radiotelephone;

converting third and fourth telephony signals into third and fourth radio signals;

combining the third and fourth radio signals into a second combined radio signal;

amplifying the second combined radio signal with a second amplifier located near a second antenna;

propagating the second combined radio signal with the second antenna; and detecting a failure associated with the first transmission link, combining the first combined radio signal with the second combined radio signal to generate a third combined radio signal, and directing the third combined radio signal over the second transmission link to the second amplifier.

19. A system for transmitting mobile radio signals, comprising:

a base station, including:

a switching circuit having first and second inputs and first and second outputs and operable in a plurality of modes, the switching circuit for receiving first and second radio signals at the first and second inputs, respectively;

a demodulator for demodulating a modulated status signal into a status signal; and a control circuit for determining a desired mode for the switching circuit based on the status signal and for placing the switching circuit in the desired mode; a tower circuit, located remote from the base station, including:

first and second amplifiers connected to first and second antennas, respectively; and a modulator for monitoring the tower circuit and for generating the modulated status signal;

a first conductor for coupling the first output of the switching circuit in the base station to the first amplifier in the tower circuit; and a second conductor for coupling the second output of the switching circuit in the base station to the second amplifier in the tower circuit;

wherein the control circuit places the switching circuit in a first mode when the status signal indicates no alarm conditions, in a second mode when the status signal indicates a first alarm condition associated with the first antenna, and in a third mode when the status signal indicates a second alarm condition associated with the second antenna and wherein the switching circuit passes the radio signals from the first and second inputs to the first and second outputs, respectively, when in the first mode, passes the radio signals from the first and second inputs to the second output when in the second mode, and passes the radio signals from the first and second inputs to the first output when in the third mode.

20. The system as set forth in claim 19, further comprising a first set of radios for receiving a first set of telephony signals and for generating a first set of radio signals, a second set of radios for receiving a second set of telephony signals and for generating a second set of radio signals, a first combiner for combining the first set of radio signals into the first radio signal supplied to the first input of the switching circuit, and a second combiner for combining the second set of radio signals into the second radio signal supplied to the second input of the switching circuit.

21. The system as set forth in claim 19, wherein the switching circuit includes a two-way combiner for combining the first radio signal from the first input with the second radio signal from the second input when the switching circuit is placed in the second or third mode.

22. The system as set forth in claim 19, wherein the base station further includes first and second reference tone generators for coupling first and second reference tones to the first and second conductors, respectively.

23. The system as set forth in claim 22, wherein the tower circuit further includes first and second reference tone detectors for detecting magnitudes of the first and second reference tones, respectively, and first and second attenuators for attenuating the first and second radio signals received over the first and second conductors to a predetermined constant value, attenuated outputs of the first and second attenuators being input to the first and second amplifiers, respectively.

24. The system as set forth in claim 19, wherein the first and second conductors comprise coax cables.

25. The system as set forth in claim 19, wherein the first and second conductors comprise optical cables.

26. The system as set forth in claim 19, wherein the base station further comprises an alarm indicator for receiving the status signal and for generating an alarm in response to an condition.

27. The system as set forth in claim 19, wherein the first and second amplifiers comprise multi-channel linear power amplifiers.

28. A tower circuit for transmitting signals in a mobile radio network, comprising:

a reference tone detector for detecting a magnitude of a reference tone generated at a base station;

a comparator for comparing the magnitude of the reference tone to a reference value and for generating a difference signal;

a variable attenuator for receiving radio signals transmitted from the base station and for attenuating the radio signals in accordance with the difference signal so as to output signals of a constant magnitude;

an amplifier for receiving the signals of the constant magnitude from the variable attenuator and for generating amplified signals; and an antenna for radiating the amplified signals.

29. The tower circuit as set forth in claim 28, wherein the amplifier is a multi-channel linear power amplifier.

30. The system as set forth in claim 28, further comprising a second comparator for detecting an absence of the reference tone.

31. The system as set forth in claim 28, further comprising a modulator for receiving status signals and for supplying modulated status signals to the base station.

32. A base station for use in transmitting signals to a tower circuit in a mobile radio network, comprising:

means for receiving a first telephony signal and for generating a first radio signal and means for receiving a second telephony signal and for generating a second radio signal;

a switching circuit having first and second inputs and first and second outputs and operable in a plurality of modes, the switching circuit for receiving the first and second radio signals at the first and second inputs, respectively;

means for generating a status signal; and a control circuit for determining a desired mode for the switching circuit based on the status signal and for placing the switching circuit in the desired mode;

wherein the control circuit places the switching circuit in a first mode when the status signal indicates a first condition, in a second mode when the status signal indicates a second condition, and in a third mode when the status signal indicates a third condition and wherein the switching circuit passes the radio signals from the first and second inputs to the first and second outputs, respectively, when in the first mode, passes the radio signals from the first and second inputs to the second output when in the second mode, and passes the radio signals from the first and second inputs to the first output when in the third mode.

33. The base station as set forth in claim 32, wherein the means for receiving the first telephony signal comprises a first bank of radios and a first combiner for combining outputs of the first bank of radios to form the first radio signal and wherein the means for receiving the second telephony signal comprises a second bank of radios and a second combiner for combining outputs of the second bank of radios to form the second radio signal.

34. The base station as set forth in claim 33, wherein the first and second bank of radios each comprises four radios and the first and second combiners each comprises a four-way combiner.

35. The base station as set forth in claim 32, wherein the switching circuit comprises a two-way combiner for combining the first and second radio signals when the switching circuit is in the second or third modes.

36. The base station as set forth in claim 32, wherein the means for generating the status signal comprises a demodulator for receiving a modulated status signal from the tower circuit and for supplying the status signal to the control circuit.

37. The base station as set forth in claim 32, further comprising an alarm indicator for receiving the status signal and for generating an alarm in response to the second and third conditions.

38. A method of transmitting signals in a mobile radio network, comprising the steps of:

receiving first and second telephony signals and generating corresponding first and second radio signals, respectively;

receiving a status signal indicating an integrity of first and second transmission paths leading to first and second antennas, respectively;

passing the first and second radio signals along the first and second transmission paths when the status signal indicates full integrity of both the first and second transmission paths;

combining the first and second radio signals to form a combined radio signal when the status signal indicates a fault in either the first or second transmission paths, passing the combined radio signal along the first transmission path when the status signal indicates that the fault is along the second transmission path, and passing the combined radio signal along the second transmission path when the status signal indicates that the fault is along the first transmission path;

placing a first amplifier along the first transmission path near the first antenna and placing a second amplifier along the second transmission path near the second antenna;

amplifying signals transmitted along the first and second transmission paths with at least one of the first amplifier or the second amplifier, respectively; and passing outputs of the first and second amplifiers to the first and second antennas, respectively.

39. The method as set forth in claim 38, wherein the step of generating the first and second radio signals comprises a step of generating a first set of radio signals and combining the first set of radio signals to form the first radio signal and generating a second set of radio signals and combining the second set of radio signals to form the second radio signal.

40. The method as set forth in claim 38, wherein the step of receiving the status signal comprises the steps of receiving a modulated status signal and demodulating the modulated status signal to form the status signal.

41. The method as set forth in claim 38, wherein the step of amplifying comprises a step of outputting signals of a constant power level.

42. The method as set forth in claim 38, wherein the step of amplifying comprises a step of attenuating signals received over the first and second transmission paths to generate signals of a constant power level and inputting the signals of the constant power level to the first and second amplifiers.

43. The system of claim 1, wherein the failure detection circuit is part of the tower circuit.

44. The system of claim 1, wherein the failure detection circuit is located in the base station.

45. The method of claim 1, wherein the detecting of the failure occurs in the tower circuit.

46. The system of claim 1, wherein the detecting of the failure occurs in the base station.

\* \* \* \* \*